(12) United States Patent
Kühlmeyer et al.

(10) Patent No.: US 8,844,283 B2
(45) Date of Patent: Sep. 30, 2014

(54) EXHAUST-GAS TURBOCHARGER WITH A BYPASS VALVE

(71) Applicants: Jens Kühlmeyer, Gifhorn (DE); Dirk Hagelstein, Braunschweig (DE); Eduard Lippert, Calberlah (DE)

(72) Inventors: Jens Kühlmeyer, Gifhorn (DE); Dirk Hagelstein, Braunschweig (DE); Eduard Lippert, Calberlah (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/789,704

(22) Filed: Mar. 8, 2013

(65) Prior Publication Data

US 2013/0186085 A1  Jul. 25, 2013

Related U.S. Application Data

(63) Continuation of application No. PCT/EP2011/004453, filed on Sep. 5, 2011.

(30) Foreign Application Priority Data

Sep. 8, 2010  (DE) .......................... 10 2010 044 683

(51) Int. Cl.
| | | |
|---|---|---|
| F02B 33/44 | (2006.01) | |
| F02D 23/00 | (2006.01) | |
| F16K 31/12 | (2006.01) | |
| B22D 41/16 | (2006.01) | |
| F02C 6/12 | (2006.01) | |
| F02B 37/18 | (2006.01) | |
| F02C 9/18 | (2006.01) | |

(52) U.S. Cl.
CPC ............. *F02B 37/186* (2013.01); *Y02T 10/144* (2013.01); *F02C 6/12* (2013.01); *F02B 37/183* (2013.01); *F02C 9/18* (2013.01); *F05D 2220/40* (2013.01)
USPC ............. 60/605.1; 60/602; 137/498; 251/356

(58) Field of Classification Search
CPC ........ F02B 37/183; F02B 37/186; F02C 9/18; F02C 6/12; Y02T 10/144; F05D 2220/40
USPC .................... 60/605.1, 602; 137/498; 251/356
See application file for complete search history.

(56) References Cited

U.S. PATENT DOCUMENTS 742,290 A * 10/1903 Clark ............................ 137/498
1,945,834 A * 2/1934 Terry ............................ 251/322

(Continued)

FOREIGN PATENT DOCUMENTS

DE 1450324 U 11/1938
DE 1820606 U 10/1960

(Continued)

OTHER PUBLICATIONS

Search Report issued by the German Patent and Trademark Office for German Patent Application No. DE 10 2010 044 683.1, dated Sep. 22, 2011.

(Continued)

*Primary Examiner* — Kenneth Bomberg
*Assistant Examiner* — Ngoc T Nguyen
(74) *Attorney, Agent, or Firm* — Manfred Beck, P.A.

(57) ABSTRACT

An exhaust-gas turbocharger is embodied with a bypass valve which is disposed in a bypass duct of a turbine between an exhaust-gas pressure line and an outlet cross section of the turbine of the exhaust-gas turbocharger and which is connected to an actuating device for controlling the throughput of exhaust-gas through the bypass duct. Through the bypass valve, a partial flow of the exhaust-gas can be guided past the turbine on demand. The bypass valve has a valve head and a valve stem. The bypass valve is axially movably held with the valve stem. The valve head, in a closed state of the bypass valve, can be placed against a valve seat in order to close the bypass duct in a gas-tight and pressure-tight manner. The side of the valve head that is connected to the valve stem faces the exhaust-gas pressure line.

10 Claims, 5 Drawing Sheets

(56) References Cited

U.S. PATENT DOCUMENTS

| | | | |
|---|---|---|---|
| 2,044,452 A * | 6/1936 | Terry | 137/489.3 |
| 2,140,027 A * | 12/1938 | Myllyniemi et al. | 137/498 |
| 3,035,408 A * | 5/1962 | Silver | 60/602 |
| 3,406,705 A | 10/1968 | Meyer | |
| 4,075,849 A | 2/1978 | Richardson | |
| 4,171,936 A | 10/1979 | Hageman et al. | |
| 4,248,047 A * | 2/1981 | Sumi | 60/602 |
| 4,307,687 A * | 12/1981 | Holstein | 123/52.3 |
| 4,311,008 A | 1/1982 | Yamada | |
| 4,353,210 A * | 10/1982 | Garrett | 60/602 |
| 4,356,695 A * | 11/1982 | Sumi et al. | 60/602 |
| 4,418,535 A * | 12/1983 | Ecomard | 60/602 |
| 4,630,445 A * | 12/1986 | Parker | 60/602 |
| 4,658,587 A | 4/1987 | Ecomard | |
| 7,434,397 B2 | 10/2008 | Hasegawa | |
| 7,562,527 B2 | 7/2009 | Eiraku | |
| 2002/0078934 A1 | 6/2002 | Hohkita et al. | |
| 2010/0180852 A1 | 7/2010 | Elsässer et al. | |

FOREIGN PATENT DOCUMENTS

| | | |
|---|---|---|
| DE | 1500149 A1 | 3/1969 |
| DE | 1450624 A1 | 5/1969 |
| DE | 2113602 A1 | 9/1972 |
| DE | 19828946 A1 | 1/2000 |
| DE | 102006024783 A1 | 11/2007 |
| DE | 102007013257 A1 | 11/2007 |
| DE | 102007055630 A1 | 5/2009 |
| DE | 102009051591 A1 | 5/2011 |
| DE | 102010036778 A1 | 5/2011 |
| GB | 1049656 A | 11/1966 |
| GB | 2033007 A | 5/1980 |
| GB | 2068455 A | 8/1981 |
| WO | 2006046810 A1 | 5/2006 |
| WO | 2008128922 A1 | 10/2008 |

OTHER PUBLICATIONS

International Search Report for International Application No. PCT/EP2011/004453, completed Jan. 16, 2012.

International Preliminary Report on Patentability for International Application No. PCT/EP2011/004453, including Written Opinion of the International Searching Authority and translation thereof, dated Mar. 12, 2013.

* cited by examiner under 35 U.S.C. §120, of
EXHAUST-GAS TURBOCHARGER WITH A BYPASS VALVE

CROSS-REFERENCE TO RELATED APPLICATIONS

This application is a continuation, under 35 U.S.C. §120, of copending International Application No. PCT/EP2011/004453, filed Sep. 5, 2011, which designated the United States; this application also claims the priority, under 35 U.S.C. §119, of German Patent Application No. DE 10 2010 044 683.1, filed Sep. 8, 2010; the prior applications are herewith incorporated by reference in their entirety.

BACKGROUND OF THE INVENTION

Field of the Invention

The invention relates to an exhaust-gas turbocharger for an internal combustion engine, wherein the exhaust-gas turbocharger is embodied with a bypass valve, which is arranged in a bypass duct of a turbine between an exhaust-gas pressure line and an outlet cross section of the turbine of the exhaust-gas turbocharger. The bypass valve is formed of a valve head and a valve stem and is connected to an electrically and/or pneumatically operable actuating device to control the throughput of exhaust gas through the bypass duct. Through the bypass valve, a partial flow of the exhaust-gas can bypass the turbine if required. The valve stern is held axially movable in a sliding guide. In order to close the bypass duct in a flow-tight manner, the valve head can be placed against a valve seat in a closed state of the bypass valve.

During the operation of an internal combustion engine with an exhaust-gas turbocharger, a partial flow of the exhaust-gas is optionally guided past the turbine of the exhaust-gas turbocharger via a bypass duct for the turbine. For this purpose, a bypass valve for opening or closing of the bypass duct, also called a wastegate valve, is disposed in the bypass duct. The bypass valve is formed of a valve head and a valve stem. In a closed state of the bypass valve, the valve head is pushed against a valve seat. In case of a load demand on the internal combustion engine, the bypass valve is dosed and pressed against the valve seat with a predetermined force, wherein the force is selected such that, during the load demand, the bypass duct is dosed in a flow-tight and pressure-tight manner against the exhaust-gas pressure of the internal combustion engine.

Exhaust-gas turbochargers with a bypass duct for the turbine of the exhaust-gas turbocharger are known from the International Publication No. WO 2006/046810 A1, U.S. Pat. No. 4,171,936 A, British Patent No. GB 1,049,656 A and UK Patent Application No. GB 2 033 007 A. These documents show an exhaust-gas turbocharger with a bypass valve arranged in the bypass duct. A mechanically and/or pneumatically operating actuating device acts on the bypass valve known from the aforementioned prior art. For the pneumatic control, the actuating device is a pressure piston connected to the valve stem, or is a pressure membrane, which is movably disposed in a workspace separated from the bypass duct. This workspace is connected, via a pressure line, with the charge air side intake manifold.

An actuating device which is driven electrically or electro-mechanically is known from U.S. Patent Application Publication No. 2002/0078934 A1.

The control of the bypass valve through the use of an electric actuating device can be performed in a more precise manner and independent of the pressure conditions in the exhaust-gas turbocharger, however, at any time in dependence of the operating range and the load demand of the internal combustion engine. Because the electric actuating devices cannot exploit the pneumatic forces of the exhaust-gas turbocharger, they must be embodied as sufficiently powerful devices. Such powerful electric actuating devices not only require a lot of energy, but they also have a correspondingly large mass with the resulting costs and increased space requirements.

In order to reduce the exertion of force by the actuating device against the exhaust-gas pressure, it is known to embody the bypass valve in the form of a poppet valve with a valve head and a valve stem. In this case, the exhaust-gas pressure acts, in the dosed state of the valve, against the valve head and pushes it into the valve seat, which assists the pressure tightness and the flow tightness.

SUMMARY OF THE INVENTION

It is accordingly an object of the invention to provide an exhaust-gas turbocharger which overcomes the above-mentioned disadvantages of the heretofore-known configurations of this general type and such that a cost-efficient actuating device with a low power input, in particular with a small installation space, and/or a low mass can be provided for the bypass valve in the bypass duct of the turbine of the exhaust-gas turbocharger.

With the foregoing and other objects in view there is provided, in accordance with the invention, an exhaust-gas turbocharger, including:

a turbine having an outlet cross section;

an exhaust gas pressure line;

a bypass duct;

a bypass valve disposed in the bypass duct between the exhaust-gas pressure line and the outlet cross section of the turbine;

a valve seat, the bypass valve having a valve head and a valve stem, the bypass valve being axially movably held with the valve stem;

the valve head, in a closed state of the bypass valve, being placeable against the valve seat in order to close the bypass duct in a gas-tight and pressure-tight manner;

the valve head having a side connected to the valve stem, the side of the valve head connected to the valve stem facing the exhaust-gas pressure line; and an actuating device, the bypass valve being connected to the actuating device for controlling a throughput of exhaust-gas through the bypass duct, such that, through the bypass valve, a partial flow of the exhaust-gas is guidable past the turbine on demand.

In other words, according to the invention, there is provided an exhaust-gas turbocharger (1), in particular for an internal combustion engine (3), which exhaust-gas turbocharger is embodied with a bypass valve (2), which is disposed in a bypass duct (4) of a turbine (5) between an exhaust-gas pressure line (10) and an outlet cross section (6) of the turbine of the exhaust-gas turbocharger and which is connected to an actuating device (7) for controlling the throughput of exhaust-gas through the bypass duct (4), wherein, through the bypass valve (2), a partial flow of the exhaust-gas can be guided past the turbine (5) as required, the bypass valve (2) has a valve head (12) and a valve stem (15), the bypass valve (2) is axially movably held with the valve stem (15), and the valve head (12), in a closed state of the bypass valve (2), can be placed against a valve seat (18) in order to close the bypass duct (4) in a gas-tight and pressure-tight manner, wherein the side of the valve head (12) that is connected to the valve stem (15) faces the exhaust-gas pressure line.

According to the invention, an exhaust-gas turbocharger is provided, in which the side of the valve head that is connected to the valve stem faces the exhaust-gas pressure line, so that the valve head is moved in a direction toward the outlet cross section for the opening of the bypass valve. In particular, the side of the valve head that is connected to the valve stem is in fluidic contact with the gas. The arrangement in the exhaust-gas turbocharger according to the invention advantageously achieves that a low power input is required because, in the open state, the valve head experiences no gas force in the closing direction.

According to another feature of the invention, there is provided a housing having a recess formed therein; and a pressure plate disposed at the bypass valve, the pressure plate being movable in the recess of the housing. In other words, a pressure plate (14) is formed at the bypass valve (2) such that the pressure plate (14) is movable in a recess (11) of a housing (13) of the exhaust-gas turbocharger (1).

According to yet another feature of the invention, the pressure plate and the valve head each have a respective gas-exposed side with a respective area, and wherein the area of the gas-exposed side of the pressure plate is at most equal to the area of the gas-exposed side of the valve head. In other words, the area of the gas-exposed side of the pressure plate (14) is less than or equal to the area of the gas-exposed side of the valve head (12).

According to a further feature of the invention, the pressure plate is accommodated or held at the valve stem.

According to another feature of the invention, there is provided a sliding guide, wherein the valve stem is axially movably held in the sliding guide.

According to yet another feature of the invention, the actuating device is electrically and/or pneumatically operable.

According to another feature of the invention, the pressure plate has a sealing element configured such that the recess is closed in a flow-tight manner against the bypass duct. In other words, the recess (11) is closed in a flow-tight manner against the bypass duct (4) by a sealing element (17) of the pressure plate (14).

According to a further feature of the invention, there is provided a compensating line. The recess is connected, by the compensating line, to the outlet cross section of the turbine.

According to yet a further feature of the invention, the compensating line is formed in the housing of the exhaust-gas turbocharger.

According to another feature of the invention, a masking is provided at the valve seat.

According to a further feature of the invention, the exhaust-gas turbocharger is configured to operate in an internal combustion engine.

Here, in a particularly preferred embodiment, a pressure plate is provided at the bypass valve, wherein the pressure plate is movable in a recess of a housing of the exhaust-gas turbocharger. Through the use of the pressure plate, it is possible to reduce the required actuating force of the bypass valve. The pressure plate is disposed in such a manner at the bypass valve that the oncoming flow to the bypass valve from the exhaust-gas pressure line is exactly between the valve head and the pressure plate. In particular, a side of the pressure plate that is disposed opposite the valve head is in a fluidic contact with the gas. Thus, the gas force acts at the same time on the valve head and the pressure plate. Preferably, the area of the side of the pressure plate that is exposed to the gas is smaller than or equal to the area of the side of the valve head that is exposed to the gas. Since the effect of the gas force on the valve head and the pressure plate is in the respective opposite direction, the forces almost cancel each other out. The exhaust-gas pressure line, also called a manifold, is a connection between the internal combustion engine and the exhaust-gas turbocharger, in which the high pressure exhaust-gas is transported from the cylinder of the internal combustion engine to the turbine of the exhaust-gas turbocharger.

The recess is preferably closed in a flow-tight manner against the bypass duct through the use of at least one sealing element of the pressure plate. This largely prevents that the gas pressure can flow behind the pressure plate. The gas pressure acts on both, the valve head and the pressure plate with almost the same force but in opposite direction, with the forces being oriented anti-parallel to one another. Since the pressure plate is connected to the valve head via the valve stem, the forces cancel each other almost completely. The actuating device of the bypass valve, for controlling the throughput of exhaust-gas through the bypass duct, needs to overcome essentially only the frictional resistance of the seals. This is particularly advantageous in case of heavily pulsating exhaust-gas exposures. Preferably, the actuating device is electrically and/or pneumatically operable.

For a mounting of the valve through the valve seat, it is particularly expedient and, as the case may be even necessary, that the diameter of the pressure plate is slightly smaller than the diameter of the valve plate. Thus the actuating device must merely provide the force for the change in the position of the bypass valve, which force is made up of only the frictional forces of the seals and the residual force resulting from the ratio of the cross section effective for the exhaust-gas pressure of the valve head and of the pressure plate. Since the pressure-effective cross-sectional area of the valve head is, due to reasons related to the mounting, greater than the pressure-effective cross-sectional area of the pressure plate, the resulting exhaust-gas force always acts in the direction of opening the bypass valve. Because the resulting exhaust-gas force is greater than the frictional forces of the seals that are to be overcome, a self-opening of the bypass valve is ensured in case of a failure of the actuating device.

So that during the movement of the bypass valve no counterpressure can build up in the recess behind the pressure plate, it is advantageous that the recess is connected with an outlet cross section of the turbine via a compensating line formed in particular in the housing of the exhaust-gas turbocharger. Thus it is at the same time also ensured that always the low exhaust-gas pressure downstream of the turbine is present at the sliding guide which is provided for guiding and sealing off the bypass valve. This pressure level is easier to control from a sealing technology point of view than the pressure prevailing in the exhaust-gas discharge line upstream of the turbine. The high pressure is only present at the substantially larger seal of the pressure plate.

A further advantageous embodiment of the exhaust-gas turbocharger according to the invention has a valve seat at which a masking is arranged. This masking makes it possible to model the exhaust-gas throughput characteristic line as desired. The masking is formed as a web-like projection, which is raised along the valve seat when compared to the immediate surroundings in the direction of the outlet cross section. Through this, up to a desired opening lift of the bypass valve, the area of the opening gap between the valve head and valve seat is restricted in accordance with the extent of the masking. Through the use of such a masking, the exhaust-gas flow through the bypass valve, in case of small opening lifts, can be prevented from flowing out via the entire circular cross-section of the valve seat. With a masking, which rises for example one millimeter relative to the valve seat and covers a sixth of the circumference of the valve seat, the exhaust-gas flow can flow only across five-sixth of the circumference of a circle in case of valve lifts of up to one millimeter and can flow across the full circumference of the bypass valve in case of valve lifts over a millimeter. Furthermore, through the choice of the position of the masking, the discharge direction of the exhaust-gas can be influenced.

Due to the actuating force being greatly reduced when compared to the prior art as well as the possibility of configuring the flow characteristic of the exhaust-gas in a flexible manner by using a masking, the bypass valve according to the invention can also be used as a two-stage or multi-stage control valve.

The invention allows numerous embodiments. In particular, these embodiments may have one, some, or all of the features described in this presentation. To further clarify its basic principle, two embodiments are shown in the drawings and are described below.

Other features which are considered as characteristic for the invention are set forth in the appended claims.

Although the invention is illustrated and described herein as embodied in an exhaust-gas turbocharger for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
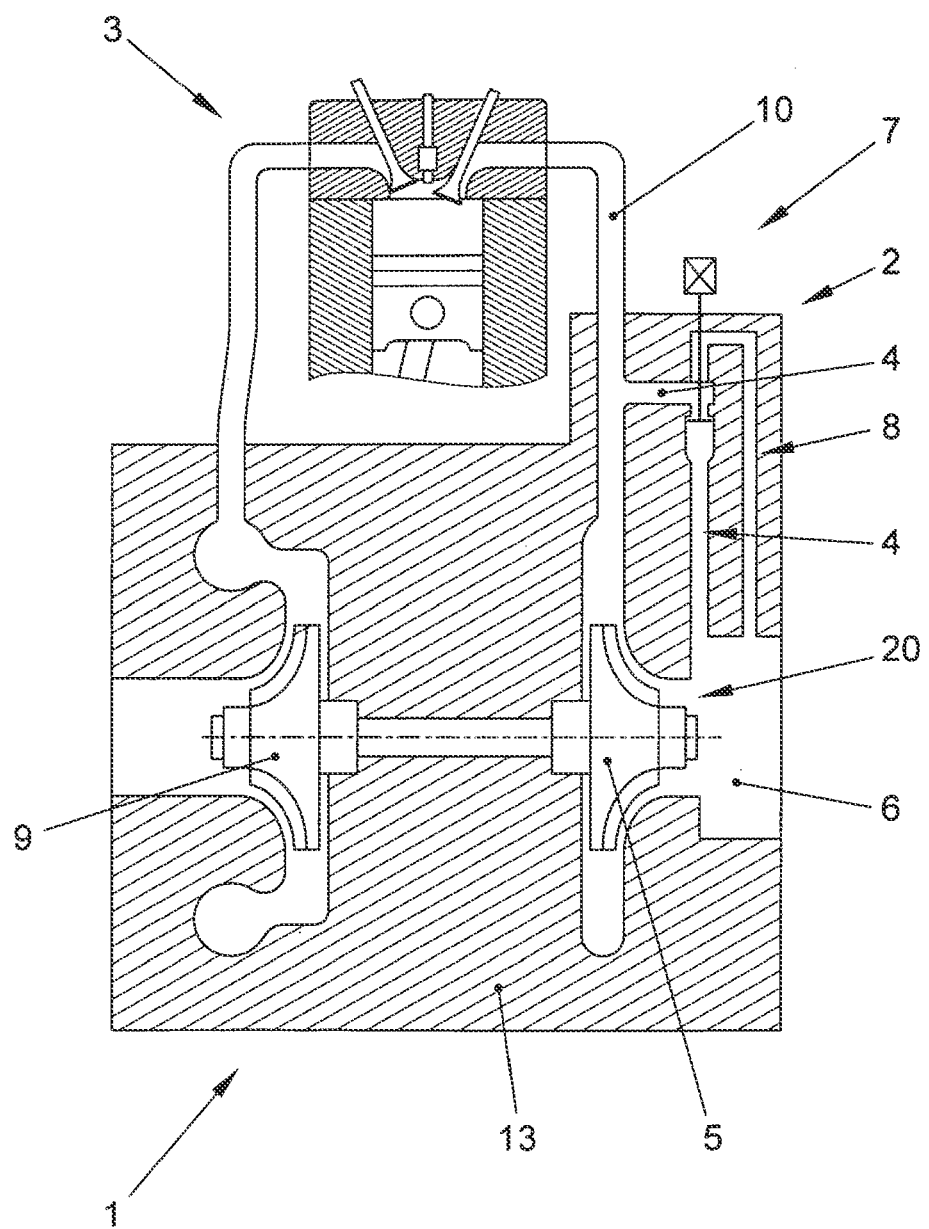
FIG. 1 is a diagrammatic sectional view of an embodiment of an exhaust-gas turbocharger according to the invention.

Referring now to the figures of the drawings in detail and first, particularly, to FIG. 1 thereof, there is shown an exhaust-gas turbocharger of an internal combustion engine 3. The exhaust-gas turbocharger 1 has a compressor 9 on the charge air side and a turbine 5 on the exhaust-gas side. In the housing 13 of the exhaust-gas turbocharger 1 a bypass duct 4 is provided for bypassing the turbine 5. The bypass duct 4 connects an exhaust-gas pressure line 10 to an outlet cross section 6 of the turbine 5. A bypass valve 2 for dosing the bypass duct 4 is disposed in the bypass duct 4. The illustrated embodiment includes a portion of the bypass duct 4 which portion is delimited by the bypass valve 2 and the exhaust-gas pressure line 10 and which can also be called a branch-off of the exhaust-gas pressure line 10. A compensating line 8 connects a recess in the area of the bypass valve 2 to the outlet cross section 6, so that there is always the same pressure in the recess as in the outlet cross section 6.

Figure 2:
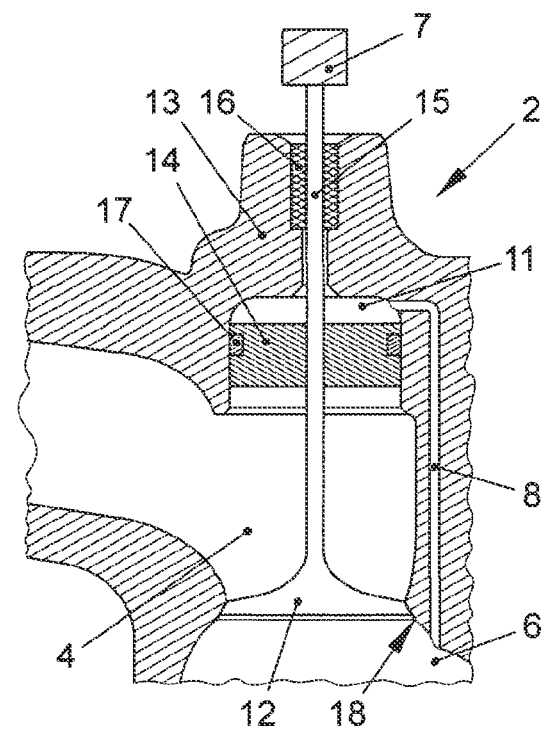
FIG. 2 is a diagrammatic sectional view of a bypass valve of a first embodiment according to the invention in a dosed state.
Figure 3:
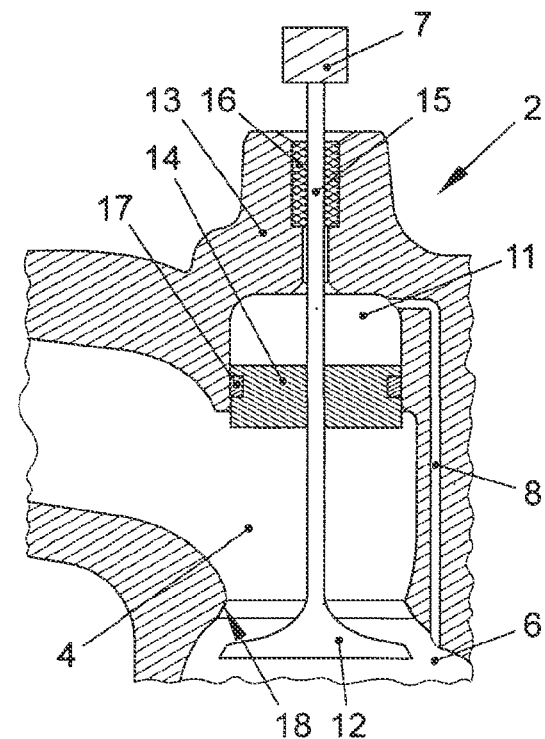
FIG. 3 is a diagrammatic sectional view of the bypass valve of the first embodiment according to the invention in an open state.

FIGS. 2 and 3 show a sectional, enlarged view of the bypass valve 2. The bypass valve 2 which is disposed in the bypass duct 4 is formed of a valve head 12 and a pressure plate 14, which are both connected to a valve stem 15 and are together movable with the valve stem 15. A recess 11 is provided in the housing 13 of the exhaust-gas turbocharger, the pressure plate 14 being movably disposed in the recess 11. The pressure plate 14 has at least one sealing element 17, which seals off the recess 11 against the bypass duct 4 in a flow-tight and pressure-tight manner. The bypass valve 2 is held with the valve stem 15 in a sliding guide 16 such that it is axially movable. The sliding guide 16 furthermore serves to seal the recess 11 against the environment. In the bypass valve 2, the side of valve head 12, which is connected to the valve stem 15, faces the exhaust-gas pressure line that is shown in FIG. 1. The bypass valve 2 is moved by an actuating device 7. The recess 11 is connected, via the compensating line 8, to the outlet cross section 6.

FIG. 2 shows the bypass valve 2 in a closed state. Here the valve head 12 is placed against a valve seat 18. The actuating device 7 which is connected with the valve stem 15 generates a closing force in order to close the bypass duct 4 in a gas-tight and pressure-tight manner.

FIG. 3 shows the bypass valve 2 in an open state. The valve head 12 has a distance towards the valve seat 18 which has been formed as an annular gap. The pressure plate 14 has been moved in the recess 11 by the same valve stroke travel.

FIGS. 4, 5, 6, and 7 show a second embodiment of the bypass valve described in the preceding figures. In this embodiment, a masking is disposed at the valve seat 18. The masking 19 is formed as a web-like projection, which, along the valve seat 18, is raised with respect to the immediate surroundings in the direction of the outlet cross section 6. Through this, the area of the opening gap between the valve head 12 and valve seat 18 is limited in accordance with the extent of the masking 19, up to a desired opening lift of the bypass valve 2. Through the use of such a masking 19, the exhaust-gas flow through the bypass valve 2 can be prevented from flowing out via the entire circular cross-section of the valve seat 18 in case of small opening lifts.

Figure 4:
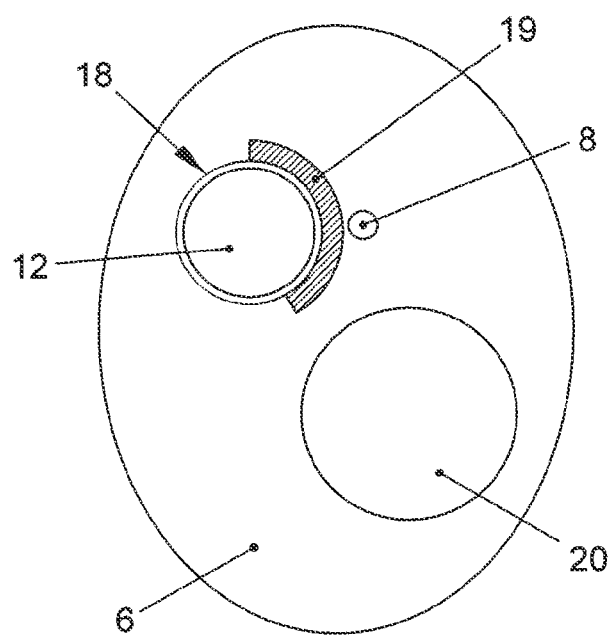
FIG. 4 is a schematic view of an outlet cross section of the exhaust-gas turbocharger with a bypass valve of a second embodiment according to the invention in a dosed state.

FIG. 4 shows a schematic view of the outlet cross section 6 of the exhaust-gas turbocharger. The side of the valve head 12 of the bypass valve facing the outlet cross section 6, the compensating line 8, the valve seat 18, the masking disposed at the valve seat 18 and a discharge opening 20 of the turbine can be identified.

Figure 5:
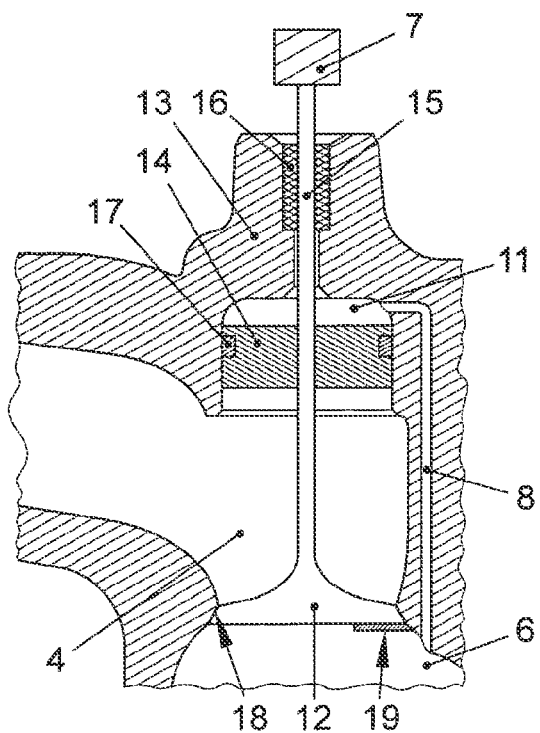
FIG. 5 is a diagrammatic sectional view of the bypass valve of the second embodiment according to the invention in a dosed state.

FIG. 5 shows the bypass valve in a closed state. Here the valve head 12 is placed against a valve seat 18. In this state of the bypass valve 2, the masking 19 is without effect.

Figure 6:
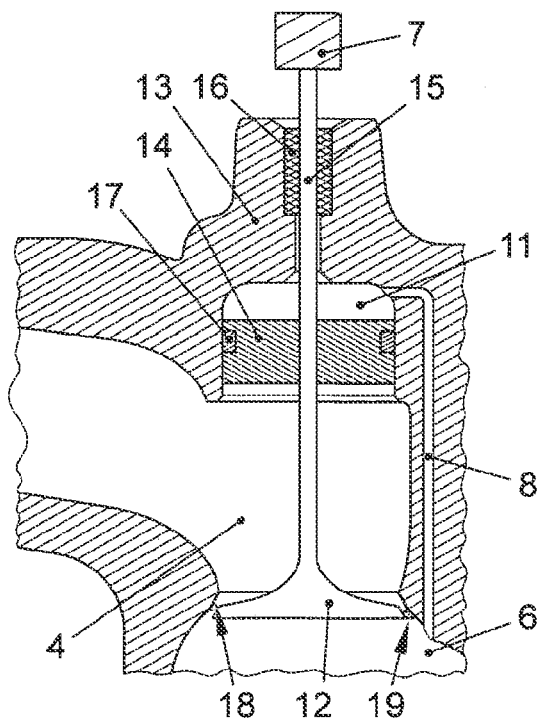
FIG. 6 is a diagrammatic sectional view of the bypass valve of the second embodiment according to the invention in a partially open state.

FIG. 6 shows the bypass valve in a partially open state. The valve head 12 has a distance to the valve seat 18. A gap is formed by this distance, wherein the gap is however limited by the masking 19. In the area of the masking 19, the valve head 12 does indeed have a spacing distance to the valve seat 18, but since the valve disk 12 is now placed against the masking 19, no gap is formed here locally.

Figure 7:
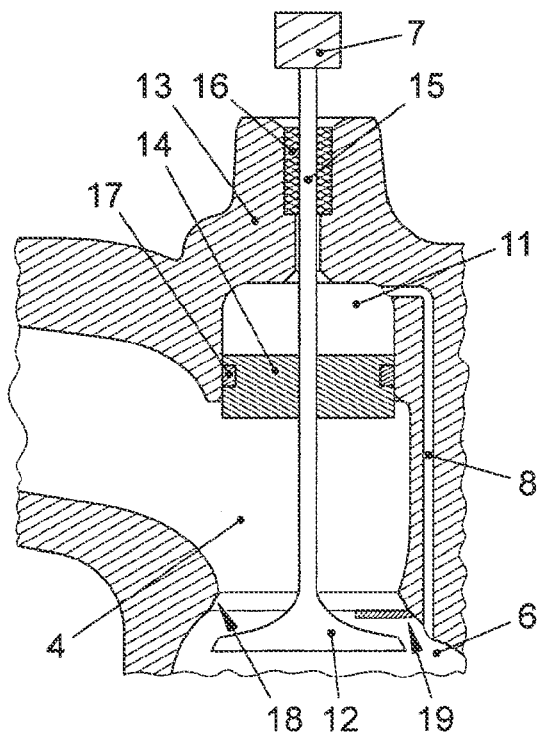
FIG. 7 is a diagrammatic sectional view of the bypass valve of the second embodiment according to the invention in a fully open state.

FIG. 7 shows the bypass valve in a fully open state. The valve head 12 is now at distance to both the valve seat 18 and to the masking 19. The gap between the valve head 12 and the valve seat 18 and, respectively, the masking 19 is formed over the entire circumference of the valve head 12.

Figures 8, 9:
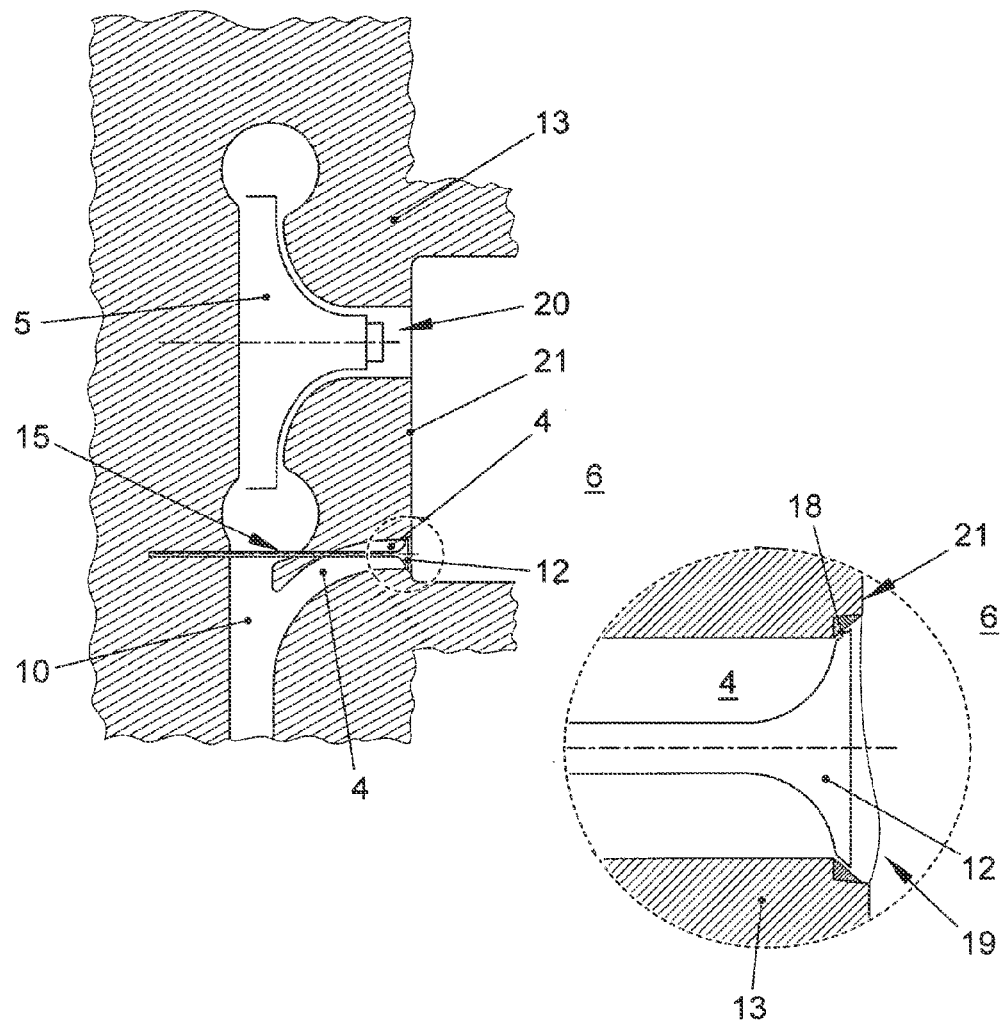
FIG. 8 is a diagrammatic sectional view of a further variant of an exhaust-gas turbocharger according to the invention.
FIG. 9 is a diagrammatic sectional view of a magnified detail illustrating the bypass valve of the exhaust-gas turbocharger shown in FIG. 8.

FIGS. 8 and 9 show a further embodiment of the exhaust-gas turbocharger, in which the masking 19 is formed by a suitable spatial shape of a surface 21 of the housing 13. FIG. 9 shows a magnified detail of the exhaust-gas turbocharger shown in FIG. 8 in order to illustrate the masking 19.

The invention claimed is:

1. An exhaust-gas turbocharger, comprising:
    a turbine having an outlet cross section;
    an exhaust gas pressure line;
    a bypass duct;
    a bypass valve disposed in said bypass duct between said exhaust-gas pressure line and said outlet cross section of said turbine;
    a valve seat, said bypass valve having a valve head and a valve stem, said bypass valve being axially movably held with said valve stem;
    said valve head, in a closed state of said bypass valve, being placeable against said valve seat in order to close said bypass duct in a gas-tight and pressure-tight manner;
    said valve head having a side connected to said valve stem, said side of said valve head connected to said valve stem facing said exhaust-gas pressure line;
    an actuating device, said bypass valve being connected to said actuating device for controlling a throughput of exhaust-gas through said bypass duct, such that, through said bypass valve, a partial flow of the exhaust-gas is guidable past said turbine on demand;
    a housing having a recess formed therein; and
    a pressure plate disposed at said bypass valve, said pressure plate being movable in said recess of said housing.

2. The exhaust-gas turbocharger according to claim 1, wherein said pressure plate and said valve head each have a respective gas-exposed side with a respective area, and wherein said area of said gas-exposed side of said pressure plate is at most equal to said area of said gas-exposed side of said valve head.

3. The exhaust-gas turbocharger according to claim 1, wherein said pressure plate is accommodated at said valve stem.

4. The exhaust-gas turbocharger according to claim 1, including a sliding guide, said valve stem being axially movably held in said sliding guide.

5. The exhaust-gas turbocharger according to claim 1, wherein said actuating device is at least one of electrically and pneumatically operable.

6. The exhaust-gas turbocharger according to claim 1, wherein said pressure plate has a sealing element configured such that said recess is closed in a flow-tight manner against said bypass duct.

7. The exhaust-gas turbocharger according to claim 1, including a compensating line, said recess being connected, by said compensating line, to said outlet cross section of said turbine.

8. The exhaust-gas turbocharger according to claim 7, wherein said compensating line is formed in said housing.

9. The exhaust-gas turbocharger according to claim 1, including a masking provided at said valve seat.

10. The exhaust-gas turbocharger according to claim 1, wherein the exhaust-gas turbocharger is configured to operate in an internal combustion engine.

* * * * *